UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF WEST ORANGE, NEW JERSEY, A CORPORATION OF NEW JERSEY.

STORAGE BATTERY AND PROCESS OF TREATING THE SAME.

999,762.  Specification of Letters Patent.  Patented Aug. 8, 1911.

No Drawing. Application filed March 20, 1908. Serial No. 422,361.

*To all whom it may concern:*

Be it known that I, THOMAS ALVA EDISON, a citizen of the United States, residing at Llewellyn Park, Orange, in the county of Essex and State of New Jersey, have invented certain new and useful Improvements in Storage Batteries and Processes of Treating the Same, of which the following is a description.

In Letters Patent of the United States, No. 946,540, granted January 18, 1910, I describe an improved method of treating the nickel hydroxid of an alkaline storage battery, whereby a desirable quantity of bismuth oxid or hydroxid will be produced within the pores of the nickel granules resulting in an increase in the capacity of the cell.

My present invention is based on the fact that by adding bismuth oxid or hydroxid to the active material of the negative electrode (finely divided iron and mercury), when the battery is first charged the bismuth oxid or hydroxid being more readily reducible than the oxid of iron, will be reduced to the metallic state and will form an amalgam with the mercury, so as to thereby produce a highly diversified system of fine vein-like conductors extending in all directions throughout the mass, and serving to act as efficient conductors for practically all the particles of active material. In this respect, a bismuth amalgam is superior to metallic mercury, because the latter tends to form in very fine globules when the iron is oxidized, so that the conducting circuits throughout the mass are broken in many places. Bismuth amalgam on the other hand, has no tendency to form globular bodies, but closely fills the spaces between the active particles. Both bismuth and mercury being difficult of oxidation will retain their metallic condition during the discharging operation, the oxidation alone affecting the electrolytically active iron mass.

In adding bismuth to the iron mass, I preferably treat the active mass after it has been introduced within the perforated pockets, and if desired, after the latter have been assembled in the plate or grid. When it is desired to also add bismuth oxid or hydroxid to the nickel on the positive electrodes, all the electrodes as a whole after they have been assembled can be subjected to the treatment by which both the active masses will be simultaneously impregnated with the bismuth salt.

In carrying the invention into effect, I firs preferably introduce under suitable pressure within the perforated pockets, a mixture of electrolytically active iron or oxid thereof, and metallic mercury. I now immerse the pockets containing the active material in a solution of a bismuth salt, dissolved in a solvent; as for example, tri-chlorid of bismuth in a strong aqueous solution of chlorid of ammonia, or tri-chlorid of bismuth dissolved in acetone. For the treatment of the iron mass, the latter solution is preferable. Enough of the solution is added to cover the active mass, and the latter is allowed to soak for several hours until the active material has become thoroughly saturated with the bismuth solution. The latter is now drained off, and a rapid superficial drying is effected by subjecting the pockets to the action of a centrifuge. The mass within the pockets is now dried and the pockets are then immersed in a 10 per cent. solution of potassic or sodium hydroxid and heated for several hours near the boiling point and for about thirty minutes at the boiling point. As a result of this treatment, the bismuth is converted to the hydrate or oxid, which will be reduced to the metallic state so as to amalgamate with the mercury, when the mass is charged. Afterward, the caustic solution is poured off and the pockets containing the active mass are successively washed with warm water until the alkali is entirely removed. Finally, the active material within the pockets, is dried, and the process is then finished. As stated the process may be carried out in the same way, after the pockets have been assembled in the plate or grid. When it is desired to similarly treat the nickel mass, all of the electrodes of the complete battery may be simultaneously subjected to the treatment described.

Having now described my invention, what I claim as new and desire to secure by Letters Patent, is as follows:

1. An active material for the negative electrode of a storage battery, comprising electrolytically active finely divided iron, and bismuth intimately associated with the active particles, substantially as set forth.

2. An active material for the negative electrode of a storage battery, comprising electrolytically active finely divided iron, and bismuth amalgam intimately associated with the active particles, substantially as set forth.

3. An active material for the negative electrode of a storage battery, comprising electrolytically active finely divided metallic material and bismuth intimately associated with the active particles, substantially as set forth.

4. An active material for the negative electrode of a storage battery, comprising electrolytically active finely divided metallic material and bismuth amalgam intimately associated with the active particles, substantially as described.

5. The process of treating active material of storage batteries, which consists in soaking the pockets carrying the active material in a solution of bismuth tri-chlorid in acetone, substantially as set forth.

6. The process of treating active material of storage batteries maintained under pressure in perforated pockets, which consists in soaking the pockets carrying the active material in a solution of a bismuth salt, and in subsequently heating the same in a caustic alkaline solution, substantially as set forth.

7. The process of treating active material for storage batteries maintained under pressure in perforated pockets, which consists in soaking the perforated pockets carrying the active material in a solution of a bismuth salt, in draining off the solution, in drying the pocket and active material, and in subsequently heating the same in a caustic alkaline solution, substantially as and for the purposes set forth.

8. The process of treating electrode plates carrying perforated pockets containing material electrolytically active in an alkaline electrolyte, which consists in immersing the plate with its pockets and active material in a solution of a bismuth salt, and in subsequently heating the same in a caustic alkaline solution, substantially as set forth.

9. The process of treating electrode plates carrying perforated pockets containing material electrolytically active in an alkaline electrolyte, which consists in soaking the plate with its pockets and active material in a solution of a bismuth salt, in drying the plates and in subsequently heating them in a caustic alkaline solution, substantially as set forth.

10. The process of treating the several electrode plates of a storage battery, containing nickel hydroxid and electrolytically active iron on the respective poles, which consists in immersing all the plates simultaneously in a solution of a bismuth salt, so as to soak the active materials therein, and in subsequently heating the electrode plates in caustic alkaline solution, substantially as set forth.

11. The process of treating the several electrode plates of a storage battery containing nickel hydroxid and electrolytically active iron on the respective poles, which consists in immersing all the plates simultaneously in a solution of a bismuth salt, so as to soak the active materials therein, then in drying the electrode plates, and in subsequently heating them in a caustic alkaline solution, substantially as set forth.

This specification signed and witnessed this 13th day of March, 1908.

THOS. A. EDISON.

Witnesses:
FRANK L. DYER,
ANNA R. KLEHN.